US012775670B2

(12) United States Patent
Cicinyte et al.

(10) Patent No.: US 12,775,670 B2
(45) Date of Patent: *Oct. 27, 2026

(54) MACHINE-LEARNED NEWS AGGREGATION AND SERVING

(71) Applicant: Newton Principle Agency Corp., Washington, DC (US)

(72) Inventors: Eva Cicinyte, Manhattan Beach, CA (US); Martin Richard Fisher, Maryland, DC (US); Katelyn Adele Therese Dudzik, Toronto (CA); John Brien Dilts, Jr., Chagrin Falls, OH (US)

(73) Assignee: Newton Principle Agency Corp., Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/188,380

(22) Filed: Apr. 24, 2025

(65) Prior Publication Data

US 2025/0252144 A1 Aug. 7, 2025

Related U.S. Application Data

(63) Continuation of application No. 18/301,276, filed on Apr. 17, 2023, now Pat. No. 12,306,890.

(51) Int. Cl.
*G06F 16/9537* (2019.01)
*G06F 16/951* (2019.01)
(Continued)

(52) U.S. Cl.
CPC ........ *G06F 16/9537* (2019.01); *G06F 16/951* (2019.01); *G06N 20/00* (2019.01); *G06Q 10/40* (2026.01)

(58) Field of Classification Search
CPC ... G06F 16/9537; G06F 16/951; G06N 20/00; G06Q 10/40
See application file for complete search history.

(56) References Cited

U.S. PATENT DOCUMENTS

| | | | |
|---|---|---|---|
| 9,569,547 | B2 | 2/2017 | Agarwal et al. |
| 10,489,473 | B2 | 11/2019 | Allen et al. |

(Continued)

OTHER PUBLICATIONS

United States Office Action, U.S. Appl. No. 18/301,276, filed May 7, 2024, eight pages.

(Continued)

*Primary Examiner* — Debbie M Le
(74) *Attorney, Agent, or Firm* — FENWICK & WEST LLP

(57) ABSTRACT

A machine-learned news aggregation system provides interfaces displaying trending topics and associated content items across a plurality of news sources and geographies. In one embodiment, the news aggregation system mines content from multiple news sources, in each of multiple geographies, using a crawling engine and accesses a plurality of social networking platforms to identify user sentiment data associated with mined content. A hybrid supervised and unsupervised machine-learned model is used to identify keywords and characteristics of the mined content, and a second hybrid unsupervised and reinforcement learning model is applied to the keywords to generate clusters of information. The system generates interactive interfaces that display, for each geography and category, a ranking of trending news topics within the geography based on the generated clusters; for each topic, a list of articles associated with the topic from the geography and other geographies; and sentiment data associated with the topic and geography.

20 Claims, 11 Drawing Sheets

(51) Int. Cl.

| | |
|---|---|
| ***G06N 20/00*** | (2019.01) |
| ***G06Q 10/40*** | (2026.01) |
| ***G06Q 50/00*** | (2024.01) |

(56) References Cited

U.S. PATENT DOCUMENTS

| | | | | |
|---|---|---|---|---|
| 11,295,398 | B2 * | 4/2022 | Jolly | G06Q 10/40 |
| 11,341,203 | B2 | 5/2022 | Jolly et al. | |
| 11,431,519 | B1 * | 8/2022 | Bullard | G06F 40/295 |
| 11,483,268 | B2 | 10/2022 | Yang et al. | |
| 11,709,686 | B1 | 7/2023 | Wehrman et al. | |
| 11,762,952 | B2 * | 9/2023 | Hlavac | G06F 16/9535<br>345/633 |
| 11,887,199 | B2 | 1/2024 | Jolly et al. | |
| 11,907,312 | B1 | 2/2024 | Li et al. | |
| 2017/0302613 | A1 * | 10/2017 | Imbrie | H04L 51/226 |
| 2018/0225378 | A1 | 8/2018 | Bhadury et al. | |

OTHER PUBLICATIONS

United States Office Action, U.S. Appl. No. 18/301,276, filed Sep. 5, 2024, nine pages.

* cited by examiner

100

MACHINE-LEARNED NEWS AGGREGATION AND SERVING

CROSS REFERENCE TO RELATED APPLICATIONS

This application is a continuation of U.S. application Ser. No. 18/301,276, filed Apr. 17, 2023, which is incorporated by reference in its entirety.

TECHNICAL FIELD

The disclosure generally relates to a mobile application, and more particularly to a news aggregation system and application that aggregates and serves content items and associated sentiments mined from multiple news sources and geographies.

BACKGROUND

Digital distribution channels may be used to disseminate a wide variety of content to users. Many people look to online sources for news about what is happening both in their own geography (city, state, and/or country) and around the world. However, to do so, a user must typically navigate to multiple websites or use multiple applications that each contain content specific to a certain geography and/or content category. For example, a user who wishes to read about how a specific event, such as the Olympics, is being covered in a variety of countries must navigate to websites associated with news sources in each of the countries of interest. Moreover, many online sources presenting as "news" may in reality provide content that is untrustworthy or biased, misleading users as to the veracity of the stories they are reading.

SUMMARY

Systems and methods are disclosed herein for a machine-learned news aggregation system that provides interfaces displaying trending topics and associated content items across a plurality of news sources and geographies. In one embodiment, the news aggregation system uses one or more crawling engines to mine news content items from websites associated with a specified number of news sources in each of a specified number of geographies (e.g., a top 10 most popular and trustworthy news sources in each of 10 countries) and user engagement and sentiment data with content items from each of a plurality of social networking platforms. After preprocessing and cleaning the mined content, the news aggregation system utilizes a multi-stage machine learning pipeline to process news content items and corresponding sentiment data. In a first stage, a data processing engine applies a hybrid machine learning system applying one or more of supervised, unsupervised, and reinforcement learning techniques to tag the mined content to identify keywords and characteristics. In a second stage, a clustering engine generates clusters of information by applying a second machine learning model to identify categories and granular keywords and/or topics. Clusters may be used to group similar information from multiple different sources and across multiple different geographies, categories of information and/or languages. For example, content items and corresponding sentiment data may be clustered based on category, subject, news source, geography or language of origin, date, and the like.

An interface generation engine generates a plurality of interfaces based on the generated clusters for display in a news aggregation application. For example, the interfaces may display, for each geography, a ranking of trending news topics within the geography based on geography-specific clusters; for each topic, a list of articles associated with the topic from the geography and other geographies; and a sentiment spectrum associated with the topic and geography. In this way, a user of the news aggregation application can see how a single topic is covered by news sources in different parts of the world, which topics are trending across one or more categories in different geographies, and which topics are popular worldwide.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

News Aggregation System Environment

Figure 1:
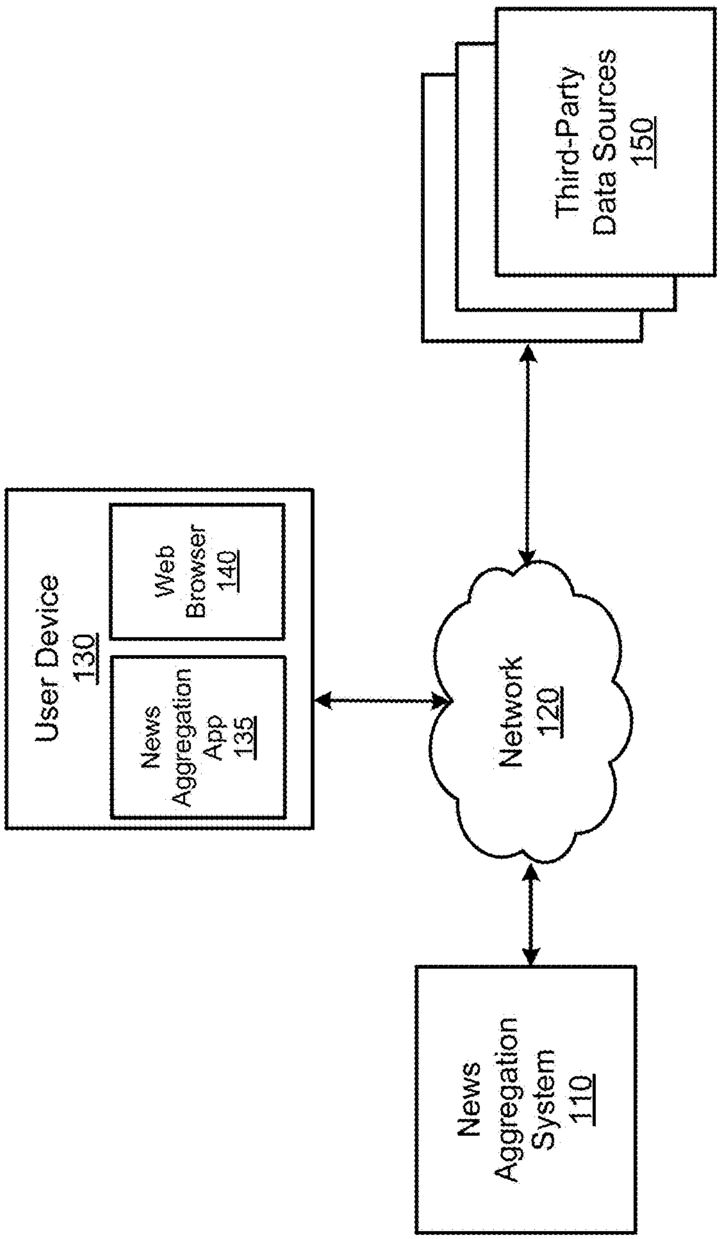
FIG. 1 is a block diagram of a system environment in which a news aggregation system operates, in accordance with one embodiment.

FIG. 1 is a block diagram of a system environment 100 in which a news aggregation system 110 operates, in accordance with one embodiment. In the embodiment shown in FIG. 1, the system environment 100 includes the news aggregation system 110, a user device 130 having a news aggregation application 135 and a web browser 140, and one or more third-party data sources 150, all connected via the network 120. In other embodiments, the system environment 100 contains different or additional elements. In addition, the functions may be distributed among the elements in a different manner than described. Moreover, while three third-party data sources 150 and a single user device 130 are shown in FIG. 1 in order to simply and clarify the description, in other embodiments, the system environment includes many third-party data sources 150 that interact with many user devices 130 associated with users of the news aggregation system 110.

FIG. 1 uses like reference numerals to identify like elements. A letter after a reference numeral, such as "150A," indicates that the text refers specifically to the element having that particular reference numeral. A reference numeral in the text without a following letter, such as "150," refers to any or all of the elements in the figures bearing that reference numeral. For example, "150" in the text refers to reference numerals "150A," "150B," and/or "150N" in the figures.

The news aggregation system 110 is a computer system (or group of computer systems) for aggregating new stories and other content items from a plurality of news sources in different geographies and generating interfaces to display content and associated sentiment analysis data to users. The news aggregation system 110 can be a server, server group or cluster (including remote servers), or another suitable computing device or system of devices. Moreover, the news aggregation system 110 may be a centralized or a de-centralized system. For example, the operations can be performed at least in part by software applications of a de-centralized system installed on individual user devices 130.

The network 120 transmits data within the system environment 100. The network 120 may comprise any combination of local area and/or wide area networks, using both wired and/or wireless communication systems, such as the Internet. In some embodiments, the network 120 transmits data over a single connection (e.g., a data component of a cellular signal, or Wi-Fi, among others), and/or over multiple connections. In some embodiments, the network 120 uses standard communications technologies and/or protocols. For example, the network 120 includes communication links using technologies such as Ethernet, IEEE 802.11, 4G, 5G, code division multiple access (CDMA), digital subscriber line (DSL), and the like. Data exchanged over network 120 may be represented using any suitable format, such as hypertext markup language (HTML) or extensible markup language (XML). In some embodiments, the network 120 may include encryption capabilities to ensure the security of customer data. For example, encryption technologies may include secure sockets layers (SSL), transport layer security (TLS), virtual private networks (VPNs), and Internet Protocol security (IPsec), among others.

Through the network 120, the news aggregation system 110 can communicate with a user associated with a user device 130. A user can represent an individual, group, or other entity that is able to interact with the news aggregation system 110 to view content and associated analytics. Each user can be associated with a username, email address, or other identifier that can be used by the news aggregation system 110 to identify the user and to control the ability of the user to view and interact with news stories or other content made available by the news aggregation system 110. In some embodiments, users can interact with the news aggregation system 110 through a user account with the news aggregation system 110 and the one or more user devices 130 accessible to the users.

A user device 130 is a computing device capable of receiving user input as well as transmitting and/or receiving data to the news aggregation system 110 via the network 120. For example, a user device can be a desktop or a laptop computer, a smartphone, tablet, or another suitable device. Each user device may have a screen for displaying content (e.g., videos, images, or other content items) or receiving user input (e.g., a touchscreen). User devices are configured to communicate via the network 120. In one embodiment, a user device executes an application, such as the news aggregation application 135, allowing a user of the user device to interact with the news aggregation system 110. Additionally or alternatively, a user can execute the web browser 140 to enable interaction between the user device 130 and the news aggregation system 110. In some embodiments, a single user can be associated with multiple user devices 130, and/or one user device 130 can be shared between multiple users who may, for example, log into a personal account on the user device 130 to access the news aggregation system 110.

One or more third-party data sources 150 are coupled to the network 120 for communicating with the news aggregation system 110. In one embodiment, a third-party data source 150 is a content provider, such as a news agency or similar entity, having one or more associated websites to which news stories and other content items are posted. Third-party data sources 150 may create and provide content of a single type (e.g., sports, politics, economics, etc.) or provide multiple types of content. A third-party data source 150 may upload content items to an associated website at specified intervals or at will (e.g., a breaking news story).

The third-party data sources 150 additionally include one or more social networking platforms on which users interact with each other to view and share content items. Content items shared to the social networking platforms may include, for example, news stories, such as those created by the news agency third-party data sources 150. The social networking platforms may provide functionality that allows users to interact with and/or express a sentiment associated with a posted content item, e.g., by "liking" or "disliking" a content item, commenting on the content item, sharing the content item with other users, etc.

News Aggregation System and User Interfaces

Figure 2:
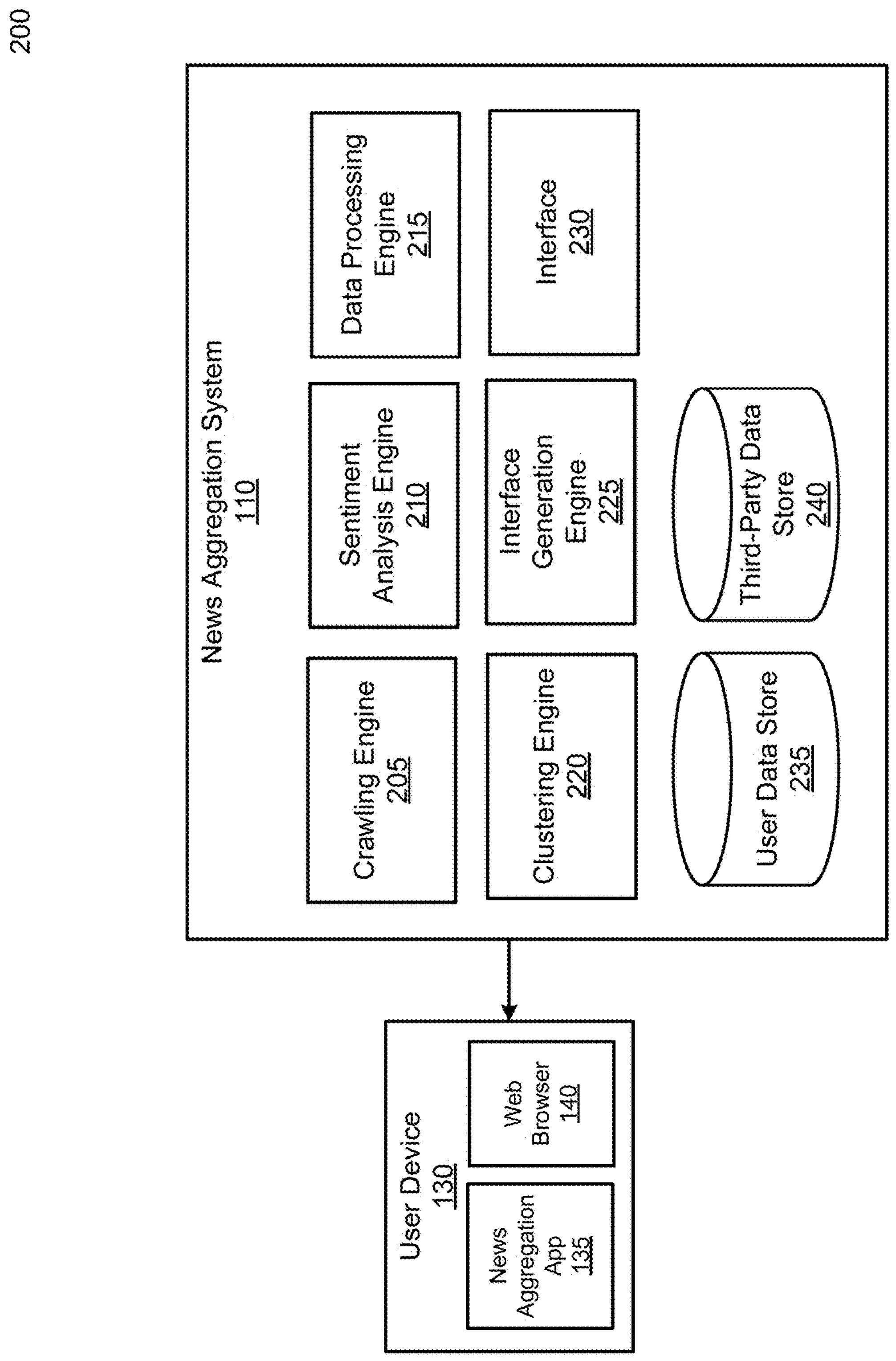
FIG. 2 is a block diagram of the news aggregation system of FIG. 1, in accordance with one embodiment.

FIG. 2 is a block diagram of a news aggregation system 110 of FIG. 1, in accordance with one embodiment. The news aggregation system 110 includes or accesses local databases such as a user data store 235 and a third-party data store 240. News aggregation system 110 includes software modules such as a crawling engine 205, a sentiment analysis engine 210, a data processing engine 215, a clustering engine 220, and an interface generation engine 225. The news aggregation system 110 also includes an interface 230, which may include hardware and/or software components, that enable the news aggregation system 110 to communicate with user devices or third-party platform servers through the network 120. The news aggregation system 110 may have alternative configurations than shown in FIG. 2, including different, fewer, or additional components.

The crawling engine 205 mines news content items and metadata from a plurality of third-party data sources 150 in a plurality of geographies for analysis by the news aggregation system 110. To do so, the crawling engine 205 receives a list of Uniform Resource Locators (URLs) of third-party data source 150 websites and monitors the websites to detect, in real-time or near-real-time, the addition of new content items, e.g., a breaking news story. The crawling engine 205 may operate according to a content retrieval schedule by querying the third-party data source 150 website for new content on a periodic basis (e.g., every 1-3 minutes) or based on a frequency with which the third-party data source 150 uploads new content to its website. In one embodiment, the crawling engine 205 retrieves, for each content item, an associated third-party data source 150, timestamps indicating the publication and retrieval times, a source language, a source country, title text, a URL of any images or videos in the content item, image or video caption text/description, a video host type, article text, available category, available tags or keywords from the third-party data source 150, and a number of different types of user engagement with the content item, such as a number of likes, comments, likes on comments, shares, etc.

In one embodiment, the monitored third-party data sources 150 are news outlets or other sources identified as trustworthy and popular in each of a plurality of geographies, such as countries, states, or other territories. For example, news content may be gathered from the top ten most popular and trustworthy or high-quality data sources of a specified number (e.g., 10, 15, 20, etc.) across multiple countries, such as countries having the highest gross domestic product (GDP) as determined by the news aggregation system 110, e.g., based on publicly available data. In another example, news stories are retrieved from a plurality of data sources in more granular geographies, such as each state in the United States, each province in Canada, etc. In one embodiment, the crawling engine 205 mines content from the same third-party data sources 150 for all categories of content displayed on the news aggregation application 135. For example, a reputable and popular news source may be mined for stories in multiple categories, such as Business, Politics, Sports, etc. Alternatively, the third-party data sources 150 may vary based on the relevant content category. For example, the crawling engine 205 may monitor a reputable and popular sports website for sports news content but not any other content categories. The news aggregation system 110 stores identifying information for the monitored third-party data sources 150 (and, optionally, associated categories of mined content) in the third-party data store 240 and may periodically add to, or update, the list of data sources 150.

In one embodiment, the third-party data sources 150 include one or more social networking platforms having publicly accessible user engagement data, that is, platforms where a first user's engagement with a content item may be viewed by other users or parties who are not logged in to a user account on the platform and/or are not connected to the first user on the platform (e.g., who are not "friends" with the user on the platform). The sentiment analysis engine 210 uses one or more sentiment data crawlers to access social networking platforms and identify and retrieve sentiment data associated with retrieved news content items, internally user-generated content, and the like. The sentiment spectrum may include user engagement data associated with news content items, such as a number of users of each platform who have expressed a positive or negative sentiment toward a news story (e.g., by "liking" or "disliking" an associated content item), have shared the news story content item on the platform, have commented on the content item, and the like. In one embodiment, the sentiment analysis engine 210 gathers sentiment data from social networking profiles of news source accounts (e.g., a news source company account and related individuals), verified users, and other identified individuals (e.g., public figures or users having a large number of followers or connections on a social networking platform).

The crawling engine 205 and the sentiment analysis engine 210 send the content items and sentiment data, respectively, to the data processing engine 215. In one embodiment, the data processing engine 215 cleans, pre-processes, and flattens the received data and archives copies of content items (e.g., in the third-party data store 240) before further processing is performed. In one embodiment, the cleaning step includes extracting preexisting content item tags or search keys, e.g., assigned by the third-party data source 150. Moreover, collected data may be translated into a specified language (e.g., English) as part of the pre-processing step.

In view of the large volume and scale of data mined by the crawling engine 205 and the sentiment analysis engine 210, in some embodiments, the data processing engine 215 may categorize the received data and divide the categorized data into multiple batches or sub-batches to avoid bottlenecks or delays in processing. Additionally, the data processing engine 215 may tokenize text values in the received data, remove stop words, and normalize the data for machine learning processing.

At a first stage of processing, the data processing engine 215 uses machine learning techniques to generate and train one or more machine-learned models to identify keywords and prevailing sentiment associated with the mined content items. In one embodiment, the data processing engine 215 uses historical keyword data and a custom-developed set of identifiers in the format of a lexicon of keywords guiding decision-making behavior to train a keyword-identifying model. For example, training data may include news articles manually tagged with one or more keywords or characteristics, keywords or tags identified by a third-party data source 150 (e.g., keywords included in metadata associated with a mined content item), words that appear most often in the articles, proper nouns (e.g., individual or entity names, event names, etc.), and the like.

Similarly, the data processing engine 215 may generate and train a sentiment model to identify user sentiment data associated with a content item. Data used to train the machine-learned sentiment model may include user sentiment data mined from one or more social networking platform third-party data sources 150 and co-occurring positive or negative text (e.g., within the content of a post), use of emojis, use of "like" or "dislike" icons on social networking platform posts, manually labeled sentiment data, words or phrases associated with positive or negative sentiment, and the like.

For both the keyword and sentiment models, different supervised machine learning techniques—such as LTSM, Cognitive Modeling Techniques, Sub-Symbolic Processing, LDA modeling, Tokenization, NDA modeling, DNN and neural networks, logistic regression, Bayesian Networks, Naïve Bayes, memory-based learning—may be used in different embodiments. Moreover, in some embodiments, the data processing engine 215 uses Symbolic Processing and Recognition Techniques within a hybrid supervised and unsupervised machine-learned model that identifies both keywords and user sentiment associated with content items. It will be apparent to one of skill in the art that any suitable machine learning or artificial intelligence techniques may be used to train the models, including one or more of supervised, unsupervised, and/or reinforcement learning.

Once trained, the one or more models receive, as input, a mined content item (e.g., a news story) and corresponding metadata, and output one or more keywords and sentiments associated with the content item. For example, the output may include a top two or three categories into which the content item is categorized and a plurality of keywords based on the substance and associated confidence value of the content item. Sentiment values are used to indicate main sentiment and associated tags may indicate the main sentiment expressed in the content item and/or in user reactions to the content item and may be binary (i.e., a specified sentiment is expressed or not) or reflect a degree of the predicted sentiment (e.g., very excited, somewhat passive). In another example, a sentiment tag for a content item indicates whether user reaction to the content item (e.g., based on the mined social networking platform data) is positive, neutral, or negative.

In one embodiment, model output is weighted based on the identified categories. For example, chunks of text in the content item that match within degrees considered to be "high-value," otherwise identified as singular-category, carry a higher weight value. Chunks that can occur across multiple topics and categories carry a lower weight value, and text identified as adjectives or tonal words receive a still lower weight. Model output is calculated as non-binary values to accommodate gradient matches and diversity.

Still further, categories and/or keywords assigned to a content item may be retrieved from a nested hierarchy. For example, a news story reporting gymnast Simone Biles' bronze medal for balance beam in the 2022 Olympics may be assigned the following subject-matter tags: "Sports," "Olympics," "Summer Olympics," "2022 Olympics," "Olympians," "Tokyo," "Simone," "Simone Biles," "Biles," "Gymnastics," "Gymnasts," "Balance beam," "Bronze medal," "Medal," and the like. The model may also output one or more directly and/or non-directly related subject-matter tags associated with the content item, including geography tags (e.g., a source country and city), date tags (e.g., timestamps indicating when the content item was published and, optionally, modified), and pre-existing tags from the third-party data source 150. Moreover, in some embodiments, the hybrid machine-learned model generates a title and/or description of the content item separate from a title and/or description supplied by the third-party source 150 from which the content item was mined.

At a second stage of processing, the clustering engine 220 uses unsupervised machine learning techniques, such as Bayesian networks, Naïve-Bayes Classification, Long-Short Term Memory (LSTM) and/or deep neural networks (DNNs) to generate clusters of information by applying the model. Keywords are identified and generated by the hybrid machine-learned model. While the primary embodiment discussed herein contemplates use of an unsupervised machine-learned model to generate clusters using the identified keywords, in other embodiments, supervised or reinforcement learning techniques, hybrid models, or any other suitable ML or AI techniques may be used to generate the clusters.

In various embodiments, the clustering engine 220 clusters content items by one or more of source, geography (e.g., country), original source language origin, category, subject, data. Continuing the example noted above, a story by a United States news source reporting Simone Biles' bronze medal may be categorized into clusters associated with its source (e.g., CNN), geography (e.g., United States), language origin (e.g., English), one or more categories or sub-categories (e.g., Sports, Olympics, gymnastics, etc.), subject (Simone Biles), etc. Generated clusters may be stored, e.g., in the third-party data store, and used to generate one or more interfaces of the news aggregation application 135, as discussed below.

Finally, the data processing engine 215 uses a reinforcement learning feedback loop in which the groupings and clusters of information generated using the supervised and unsupervised learning states apply reinforcement learning algorithms to improve the news aggregation system's ability to create predictions and descriptions of connections across entitles, objects, subjects, topics, and categories. The model has multiple reinforcement loops occurring at different stages of the model processing the feedback loops on stage 1: categorization, stage 2: topic identification and keyword specification, and stage 3: user behavior and feedback, refining the models in feedback loops over time. In one embodiment, the data processing engine 215 can provide guidance, strengthen relations, and enable learning to occur at various system stages along the pipelines and within ML learning sections and Memory stores, including retraining the keyword-identifying and/or sentiment model. For example, clustered relationships between categories and topics that are new, pre-existing, emergent, and the like can influence relationships, a user may reject a keyword generated by the keyword-identifying model or suggest a keyword that was not identified by the model, and so on. Similarly, a user may manually override a predicted sentiment or suggest a different sentiment associated with a content item. In both examples, the data processing engine 215 uses the user engagement feedback with activities, keywords, and content as additional training data to inform the model behavior to improve performance. Analytics are produced through applying the results of each stage of learning to numerical values and features (such as country or date). Analytics are produced through applying the results of a) external values gathered from social behavior in public spaces and b) user engagement within the app related to the user feedback loop.

Figure 3A:
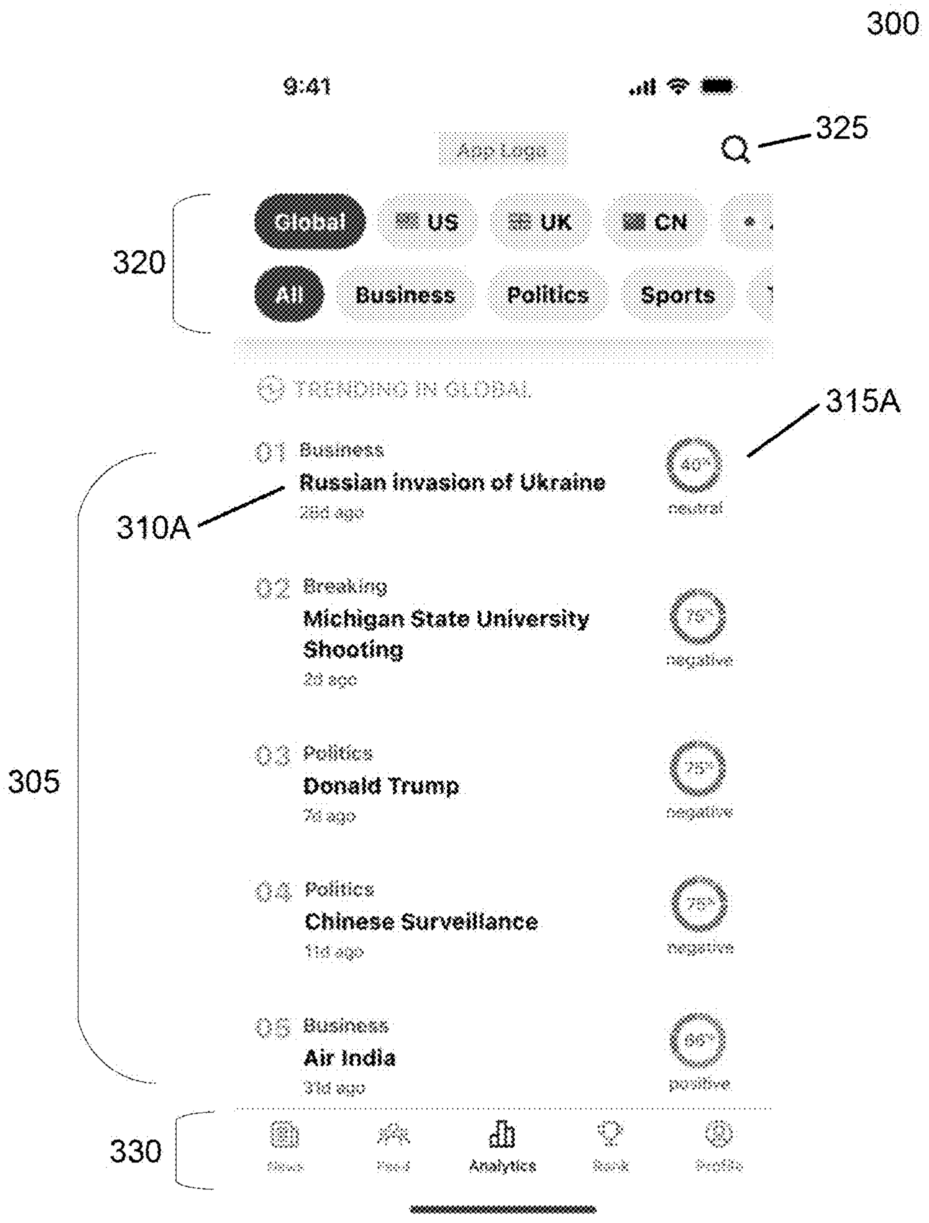
FIGS. 3A-3C are example user interfaces illustrating trending topics and associated sentiment analytics across geographies, in accordance with one embodiment.
Figure 3B:
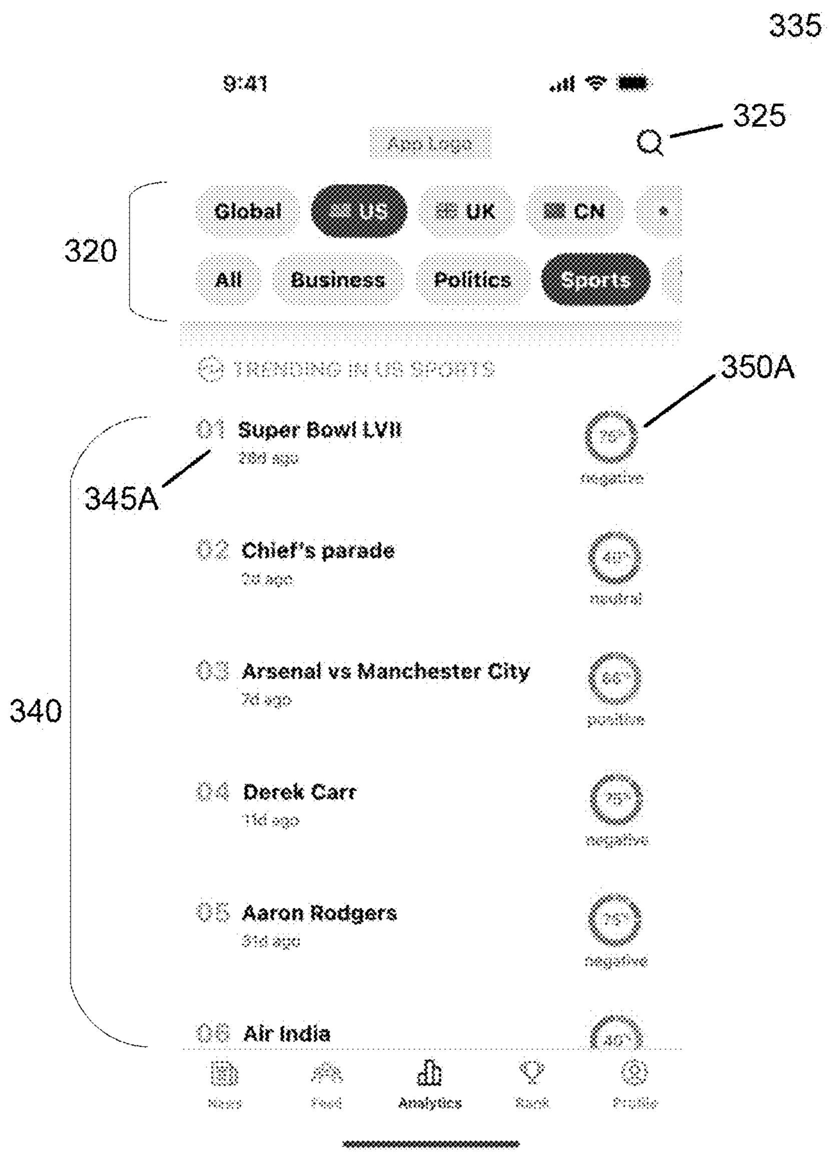
Figure 3C:
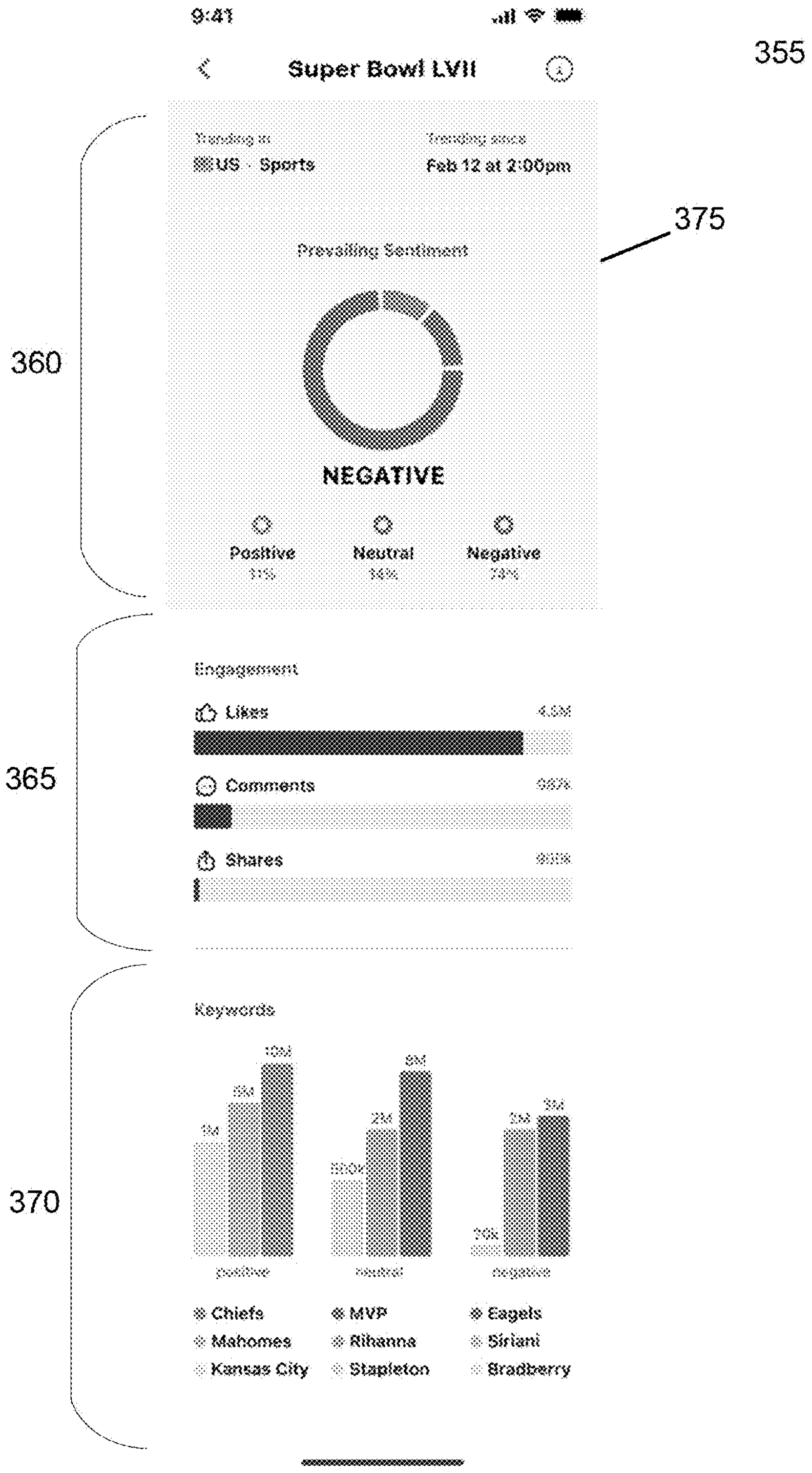

The interface generation engine 225 generates user interfaces for display to users of the news aggregation system 110 via the news aggregation application 135 or the web browser 140. The interfaces include: (1) for each geography, a ranking of trending news topics within the geography based on clusters associated with the geography; (2) for each topic and category, a list of content items (e.g., news articles) associated with the topic from the geography and/or other geographies, and (3) the sentiment spectrum associated with the topic and geography. FIGS. 3A-3C are example user interfaces generated by the interface generation engine 225 and illustrate trending topics and associated sentiment analytics across geographies and categories. Users may sort topics by category and/or geography or view trending topics across all categories or all geographies. For example, the user interface 300 of FIG. 3A includes a list 305 of topics 310 that are "Trending in Global" (i.e., are popular across the various geographies for which the news aggregation system 110 collects content items). The topics 310 may ranked (e.g., by popularity), and each topic displayed with an indication of the associated category (e.g., "Business," "Breaking," "Politics," etc.), a date tag (e.g., indicating a duration that the topics has been trending within the last Day, Week, Time Frame and Duration), and a sentiment analytics element 315. In the embodiment shown in FIG. 3A, the sentiment analytics element 315 is a graph that represents the respective division of positive, negative, and neutral sentiment associated with the topic and an overall sentiment label for the topic based on sentiment data retrieved from the social networking platforms. Sentiments may be represented by different colors assigned to each variable or otherwise visually distinguished from each other. Where the sentiments are within a threshold percentage of each other, the interface generation engine 225 assigns a "neutral" label to the topic. For example, the first trending topic 310A in the list of topics 305 is "Russian invasion of Ukraine," which was assigned to the "Business" category and has been trending for 28 days. The sentiment analytics element 315A indicates a 40% neutral sentiment in user reaction surrounding the topic at a global scale, resulting in a "neutral" label.

The user interface 300 also includes a set of interface elements 320 that allow the user to toggle between geographies (e.g., "United States," "United Kingdom," "China") and categories ("Business," "Politics," "Sports," etc.) to narrow the list of displayed topics, view topics that are trending in different geographies, and view how similar topics are being reported by news sources in different geographies. The interface 300 includes a visual indication of the selected interface elements. For example, in FIG. 3A, the interface elements labeled "Global" and "All" are highlighted to indicate that the displayed list includes topics that are trending across all categories and jurisdictions. In one embodiment, this interface generation engine 225 may provide this list (e.g., "Trending in Global") as the default analytics landing page on the news aggregation application 135. Alternatively, the default display may be based on user selection or geographies and/or categories with which the user frequently interacts. By allowing the user to toggle between different geographies, the news aggregation system 110 enables the user to view what news sources are talking about in different countries or how different countries might be reacting to similar stories (e.g., how new sources in the United States and China differ in their coverage of an event).

The interface elements 320 may be scrolled horizontally by row to allow the user to select between all of the geographies and categories for which the news aggregation system 110 provides news content. The order in which geographies and categories are displayed may be uniform for all users of the news aggregation system 110, may be modified by the user, or may be automatically set by the interface generation engine 225 based on one or more conditions, such as the user's location or the categories of content with which the user frequently interacts. The interface 300 also includes a search ability 325 (e.g., an icon) that enables the user to search the news aggregation application 135 (e.g., for a category, specific topic, keyword, content item, news source, or the like) and a set of icons 330 that allow the user to navigate between different tabs or sections of the news aggregation application 135. For example, as indicated in FIG. 3A the user interface 300 is displaying an "Analytics" tab of the application 135. The user may select a different icon 330 to navigate to a "News," "Feed," "Rank," or "Profile" tab.

The user may provide input to toggle to a different set of trending topics by selecting one or more of the interface elements 320. For example, FIG. 3B illustrates a user interface 335 with a list of trending topics for the geography "United States" and the category "Sports." While the user interface 335 indicates a single geography selection and a single category selection, in other embodiments, the user may select multiple geographies and multiple categories, to a single category, multiple categories to a single country, multiple categories to multiple countries; to a single topic multiple categories, to multiple topics to single category, to multiple topics to multiple categories; to a single topic to multiple countries, to multiple topics to a single country, to multiple topics to multiple countries (e.g., to view trending Sports topics in both the United States and United Kingdom, to view trending Business and Politics topics across all geographies, etc.). Responsive to receiving user selection of one or more geographies and/or categories, the interface generation engine 225 generates and provides for display an updated list of trending topics reflective of the selected parameters. For example, the list 340 of includes topics 345 that are "Trending in US Sports," including trending topic 345A "Super Bowl LVII" with an associated sentiment analytics element 350A.

The user may select a sentiment analytics element 350 to view additional information about user engagement with a corresponding topic. For example, FIG. 3C illustrates a user interface 355 showing sentiment and engagement analytics data associated with the "Super Bowl LVII" topic. The interface 355 indicates that the topic is trending in the United States and the Sports category and has been trending since February 12 at 2:00 pm. Also displayed in the interface 355 are a breakdown 360 of prevailing sentiment for the topic, user engagement data 365, and topic keyword data 370 with associated sentiment analytics. The breakdown 360 includes a graph such as a pie chart 375 representing the respective division of positive, negative, and neutral sentiment associated with the topic as well as an overall topic sentiment label. In one embodiment, the pie chart 375 displayed in the interface 355 is an enlarged version of the sentiment analytics element 350A of FIG. 3B and also includes respective percentages for each of the positive, neutral, and negative sentiments, which represent the sentiments that users have expressed regarding content items (e.g., news stories) clustered within the associated topic. For example, the breakdown 360 indicates that the "Super Bowl LVII" topic is associated with a 74% negative sentiment in user reaction (e.g., in the United States or in all geographies represented in the news aggregation application 135), a 14% neutral sentiment, and an 11% positive sentiment, resulting in a "Negative" label.

The user engagement data 365 includes statistics for one or more types of user engagement with content items associated with the displayed topic. In various embodiments, the engagement data reflects user actions taken on the social networking platforms, user actions taken on the news aggregation application 135, or both. While the statistics shown in FIG. 3C reflect user engagement type features, often referred to as "likes" (which may be expanded to include other forms of positive engagement statistics, comments, and shares of content items), additional or different types of user engagement may be displayed.

The topic keyword data 370 indicates types of user sentiment and corresponding statistics for different keywords within the selected topic (e.g., the top three positive, negative, and neutral keywords for the topic). In the embodiment shown in FIG. 3C, the interface includes keywords of the "Super Bowl LVII" topic having positive, neutral, and negative sentiments. For example, the data 370 indicates varying degrees of positive sentiment associated with the keywords "Chiefs," "Mahomes," and "Kansas City," neutral sentiment associated with the keywords "MVP," "Rihanna," and "Stapleton," and negative sentiment associated with the keywords "Eagles," "Siriani," and "Bradberry." For each keyword, the interface includes a number of instances of the associated sentiment (e.g., 1 million instances of a positive sentiment expressed for the "Kansas City" keyword, 2 million instances of a neutral sentiment expressed for the "Rihanna" keyword, and 3 million instances of negative sentiment expressed for the "Eagles" keyword). The interface generation engine 225 may use different shades or opacities of a color or otherwise visually distinguish keyword sentiment based on a number of sentiment instances (e.g., the "Chiefs" keyword may be represented by a darker or more opaque shade of green than the "Kansas City" keyword to reflect that the "Chiefs" keyword has 10 million instances of positive sentiment while the "Kansas City" keyword has 1 million instances of positive sentiment).

Figure 4A:
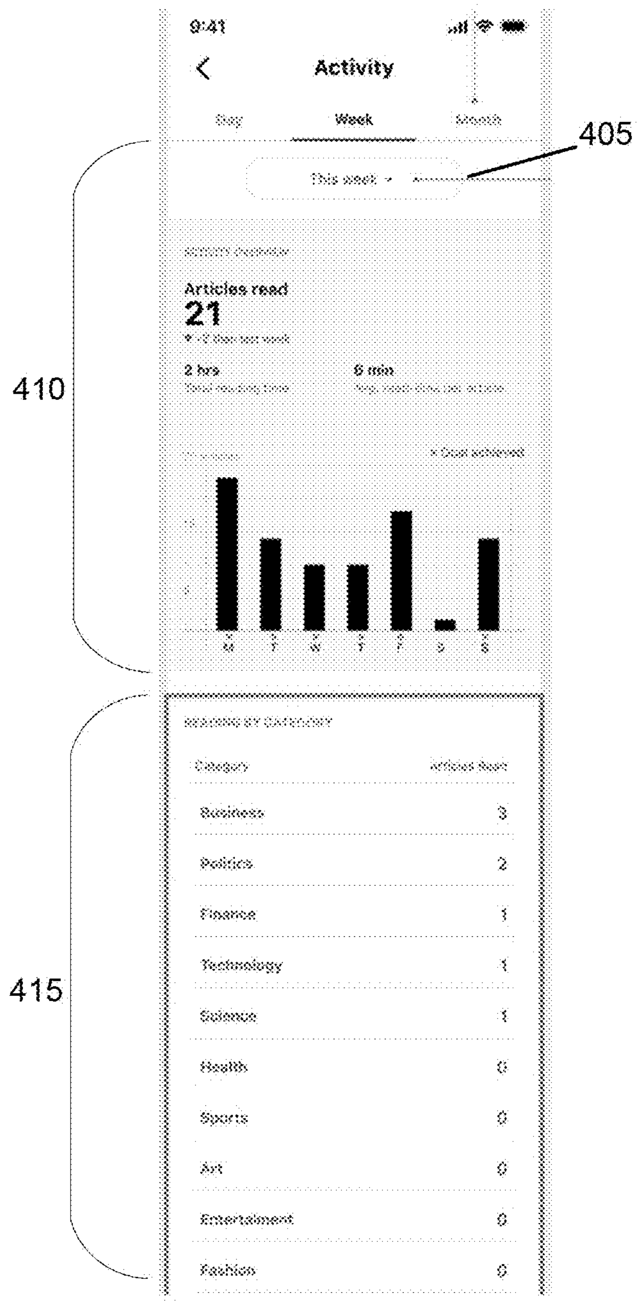
FIGS. 4A-4B are example user interfaces illustrating user activity statistics, in accordance with one embodiment.
Figure 4B:
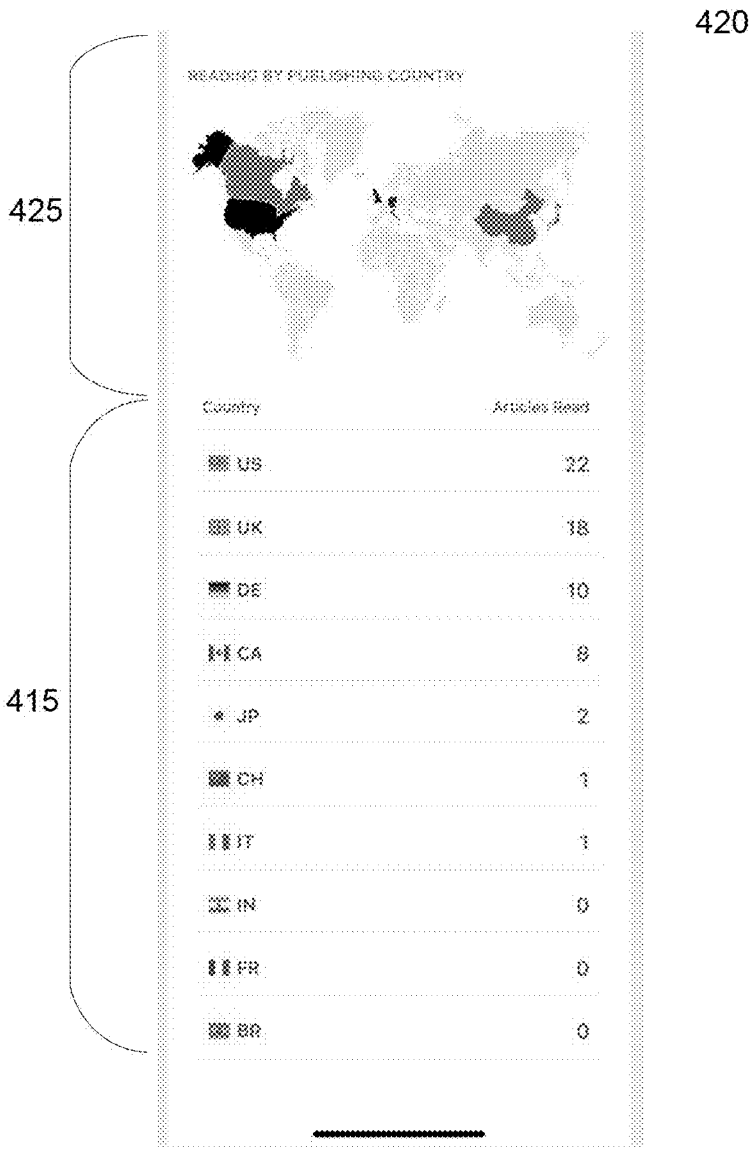

The interface generation engine 225 also generates and displays user interfaces (e.g., in the "Rank" tab) that illustrate user activity on the news aggregation application 135. User activity data may reflect an individual user's interaction with content items on the news aggregation system 110. For example, FIG. 4A is an example interface 400 displaying a user's activity on the news aggregation application 135 over a selected time period (e.g., "Daily," "This Week," "This Month2x"). The user may toggle between different time periods or select a different time period from a list 405 (e.g., a drop-down list referring to all time points within a user's history, separated within chunks of various sub-categories of group) to view other statistics. For the selected period, the interface 400 provides an activity overview 410 and a content item breakdown 415. The activity overview 410 includes statistics about the user's activity on the application 135, such as the record of number of articles read over the selected time period, a comparison between the number of articles read in the current time period relative to a previous time period, a total reading time, average reading time per article (both present and in past windows of time), a number of articles read during series of both longer and shorter time periods (e.g., where the selected time period is a week, a number of articles read each day), and an indication of whether the user achieved a pre-selected "reading goal" for the selected time period and/or time periods outside of the currently selected window of use (e.g., a weekly or daily goal). The "reading goal" may be customized by the user or selected from a pre-generated set of goals suggested by the news aggregation system 110 (e.g., based on the user's level of activity on the application 135 or the activity of other users). The content item breakdown 415 provides a more detailed substantive view of the user's activity. For example, in FIG. 4A, the breakdown 415 includes a list of a number of articles that the user read in each of a plurality of categories. Additionally or alternatively, the breakdown 415 displays a number of articles per news source or per geography, as shown in the interface 420 of FIG. 4B. In some embodiments, the interface 420 also includes a map view 425 in which the geographies from which the user read content are visually distinguished on a map view representing all global regions. User activity data, such as the data displayed in FIGS. 4A and 4B, may be stored in a user profile in the user data store 235.

Activity data may also be used to rank users of the news aggregation system 110. For example, the interface generation engine 225 may retrieve user activity data from the user data store 235 and generate one or more rankings based on the number of articles that users have read. Rankings are lists of ordered user activity, demonstrating groups of high-to-low ordered statistics correlated with users, their in-app activity and performance, as well as other dynamic and/or static variables. Rankings may be limited to specified geographies and content categories and/or may reflect user activity for all geographies and categories and may be limited to a specified number of users or reflect a ranking of all users of the news aggregation system 110. The interface generation engine 225 generates one or more leaderboard interfaces using the determined rankings. For example, a leaderboard interface may display a ranking of all users in a first user's primary location (e.g., all users in the United States) or a ranking of users who interact with a specified content category (e.g., users who read "Sports" content), among other possible in-app content engagement types. In one embodiment, the user may toggle the leaderboard interface to display different rankings (e.g., to compare the user's ranking in location-specific and worldwide leaderboards and between other users within the platform).

Figure 5A:
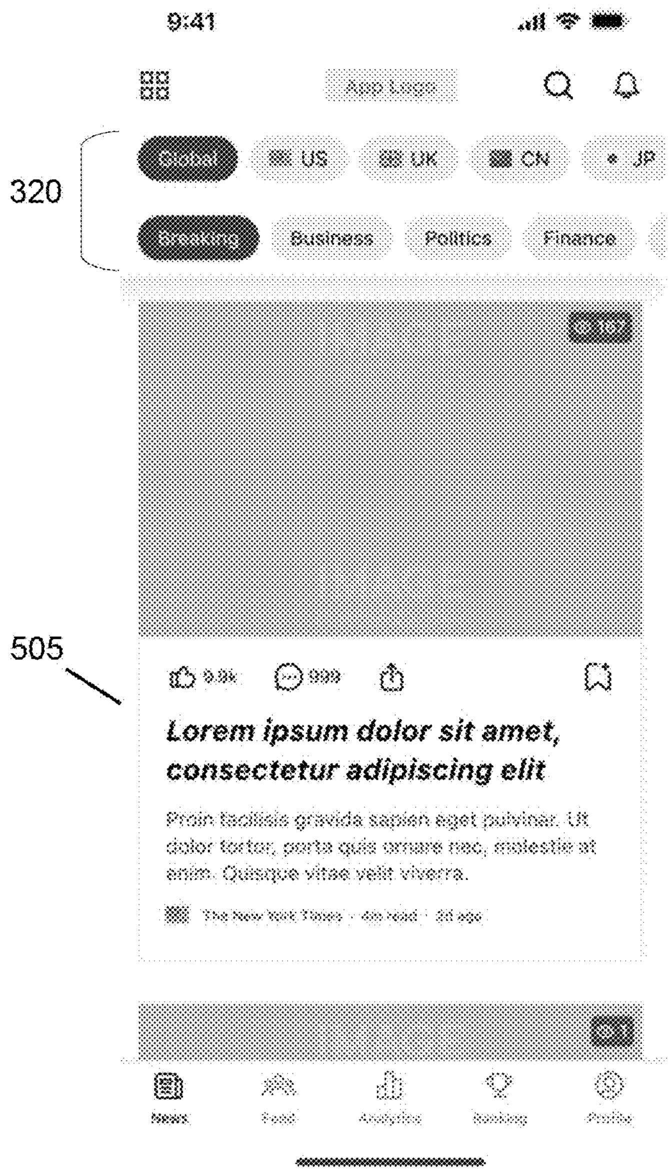
FIGS. 5A-5B are example user interfaces illustrating default article views, in accordance with one embodiment.
Figure 5B:
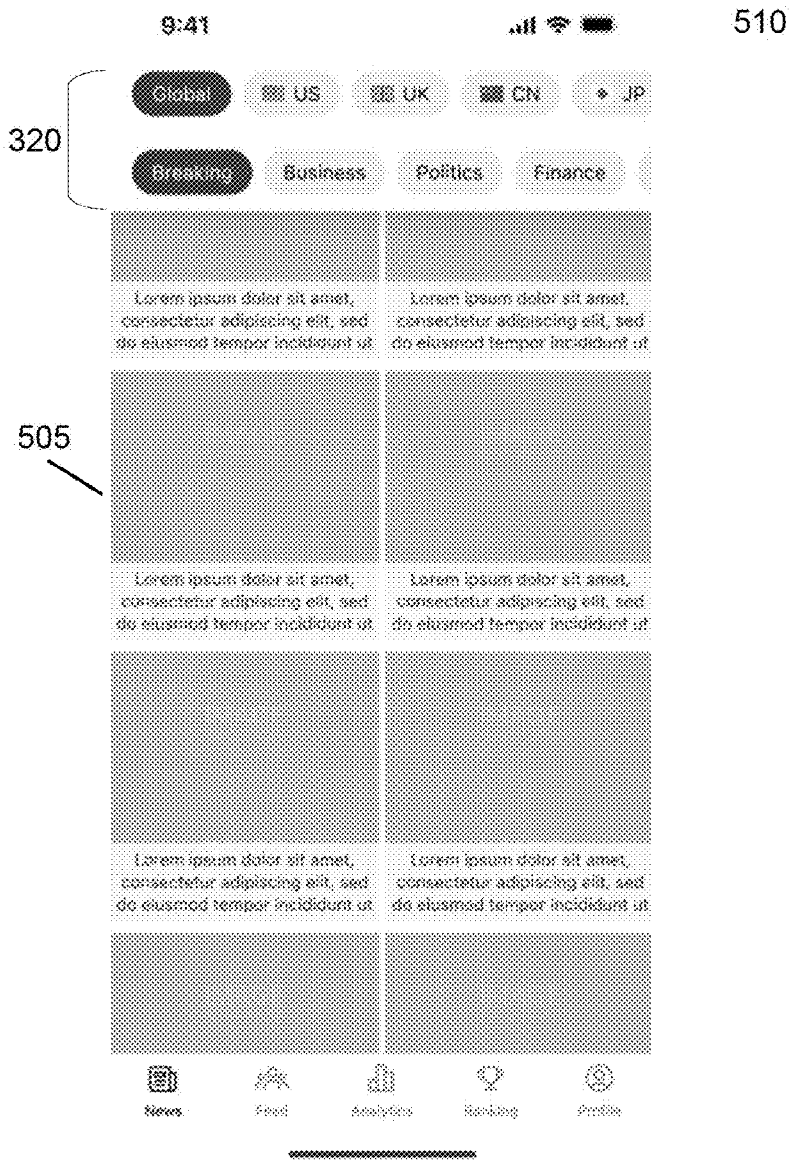

The interface generation engine 225 also generates and displays user interfaces (e.g., in the "News" tab) for reading and interacting with various content item types (e.g., news stories) on the news aggregation application 135. A content item (such as the content item 505) might be displayed in a list view 500, as shown in FIG. 5A or a grid view 510, as shown in FIG. 5B and reflect the user's geographical and content selections (e.g., via the interface elements 320). In all views, the user may select the content item to view the article, including any corresponding photos or videos, and may also view the source of the content item and user engagement statistics (e.g., a number of likes or comments, responses to the article, associated content across the app). The user may also use various interface elements to share the content item with other users of the news aggregation system 110 or save the content item (e.g., to a user profile).

In one embodiment, the interface generation engine 225 allows a user to engage with a content item on the news aggregation application 135 by using one or more provided templates to create and publish a responsive content item. Responsive content items may include a response to a portion (e.g., a single sentence, select sentences, or paragraph) of an existing article or the entire article, and/or in-app generated content (e.g., analytics, user-generated editorials or responses to articles). Corresponding templates allow a user to select some or all of a target article or content to respond to, upload a photograph and/or video (in one embodiment, users may upload multiple pieces of media content throughout generated content), add a title and text (e.g., up to a specified number of words), and publish the response on the news aggregation application 135. Users may also use similar templates to create other content items (e.g., standalone, non-responsive articles) for publication on the application 135.

The user data store 235 is a file storage system, database, set of databases, and/or other data storage system storing information associated with accounts of the news aggregation system 110. Stored account information may include general user information (e.g., username, password, demographic information, contact information, etc.) and user activity data on the news aggregation system 110, such as user rankings, reading goals, categories of content that the user frequently interacts with, content that the user has created or shared on the news aggregation system 110, other users that the user follows or is otherwise connected to on the news aggregation system 110, news sources or geographies from which the user views content, engagement activity with in-app content such as reactionary interactions, and the like. A user may provide input through the interface 230 to update account information, view activity data, change goals, etc.

The third-party data store 230 is a file storage system, database, set of databases, or other data storage system storing information associated with third-party data sources 150 from which the news aggregation system 110 mines content. Stored third-party data source 150 information may include an identification of a third-party data source 150, on or more URLs associated with third-party data source 150 website(s), data regarding the frequency with which the third-party data source 150 uploads new content to its website(s), categories into which the third-party data source's content is categorized, user engagement data for the third-party data source's content items, and the like. In one embodiment, the third-party data store 230 also stores lists of third-party data sources 150 from which the news aggregation system 110 mines content across each geography. The lists may be periodically updated to reflect the addition of new news sources in currently represented geographies, as well as additional distinct geographies. Still further, the third-party data store 230 may store social networking platform data, including data identifying the social networking platforms from which the news aggregation system 110 mines user engagement data.

The interface 230 is an interface for a user and/or third-party data sources 150 to interact with the news aggregation system 110. The interface 230 may be a web application that is run by a web browser, such as the browser 140, at a user device 130 or a software as a service platform that is accessible by the device 130 through the network 120. The interface 230 may be the front-end component of a mobile application or a desktop application, such as the news aggregation application 135. In one embodiment, the interface 230 may use application program interfaces (APIs) to communicate with user devices 130 or third-party data sources 150, which may include mechanisms such as webhooks.

Example Method

Figure 6:
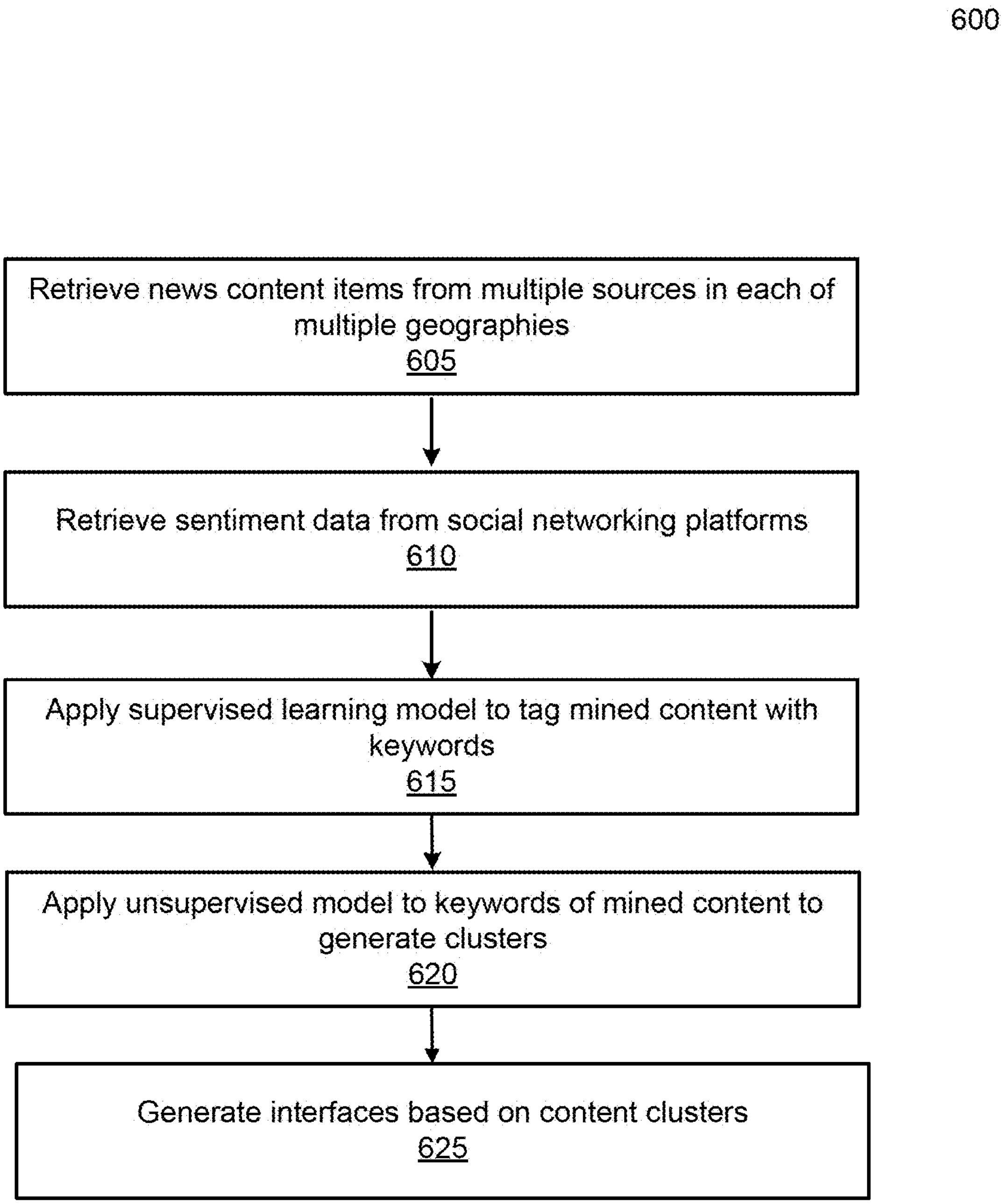
FIG. 6 is a flow chart illustrating an example process for providing aggregated news content from a plurality of sources and geographies, in accordance with one embodiment.

FIG. 6 is a flow chart illustrating a method 600 for providing aggregated news content from a plurality of sources and geographies, according to one embodiment. The steps of FIG. 6 are illustrated from the perspective of the news aggregation system 110 performing the method 600. However, some or all of the steps may be performed by other entities and/or components. In addition, some embodiments may perform the steps in parallel, perform the steps in different orders, or perform different steps.

The method 600 begins with the crawling engine 205 of the news aggregation system 110 retrieving 605 news content items and associated metadata from a plurality of third-party data sources 150 (e.g., news sources) across a plurality of geographies. Content items may be retrieved or mined in real-time or near-real-time (e.g., according to a content retrieval schedule) to allow modules of the news aggregation system 110 to process news stories shortly after they are posted and generate interfaces that include up-to-date stories across a variety of categories and geographies. In one embodiment, news story content items are mined from websites associated with a specified number of third-party data sources 150 in each of a specified number of geographies (e.g., a top ten news sources in each of ten countries). Associated metadata may include a title of the news story, one or more authors, an identification of the third-party data source 150, a URL identifying a location of the story on the third-party data source website, one or more categories, keywords, or tags (e.g., assigned by the third-party data source 150), an associated geography, a story publication date, a story modification date, and the like.

At 610, the sentiment analysis engine 210 uses one or more sentiment data crawlers to access public profiles of a plurality of social networking platforms to identify and retrieve, in real-time or near-real-time, sentiment data associated with retrieved news content items. The sentiment data may indicate user engagement data with the content items, such as a number of users on each platform who have expressed a positive or negative sentiment towards the content item, such as by "liking" or "disliking" the content item, commenting on the content item, etc. Retrieved sentiment data may also include the content of user comments on the content item.

After cleaning and pre-processing the retrieved news story content items and sentiment data, a data processing engine 215 uses a first machine-learned model to process and categorize or tag 615 the mined content with keywords and various characteristics. As discussed above, the first model may be trained using one or more of supervised, unsupervised, and reinforcement learning techniques. Keywords generated by the machine-learned model may include one or more of the same keywords provided by the third-party data source 150 associated with the news story or may differ from the third-party data source-supplied keywords or tags. In one embodiment, the machine-learned model also outputs, for each content item, one or more associated categories, topics, and sentiment tags. The sentiment tags may reflect, for example, one or more sentiments expressed in the content item and/or in user responses to the content item (e.g., positive, neutral, or negative user responses in various degrees, such as percentage or fraction and/or binary values).

At a second stage of processing, a clustering engine 220 applies 620 a custom algorithm-based second machine-learned model to identify and produce keywords from mined content items to generate clusters, which may create connections representing co-occurring topics across batches of information. In one embodiment, the second machine-learned model is an unsupervised model. Emergent entities that arise from content are represented within various areas of the application for user engagement, including Search and Analytics. After content has been passed through the various stages of cleaning, processing, and AIML systems, the articles are grouped and stored, for example, based by source, geography, language origin, category, subject, date, etc. Clustering news stories in this way allows the news aggregation system 110 to group similar information from multiple different sources and across multiple different geographies and languages for display in interfaces on the news aggregation application 135. In one embodiment, the data processing engine 215 and clustering engine 220 perform updated processing in response to receiving additional news story content items and sentiment data associated with a topic, which allow a user to view new keywords associated with a topic and understand how public sentiment towards a topic may change over time. Moreover, in some embodiments, the data processing engine 215 performs reinforcement learning to improve the knowledge and performance of first and second machine-learned models over time.

The interface generation engine 225 uses the clustered content items to generate 625 a plurality of interfaces for display in the news aggregation application 135. In one embodiment, the interface generation engine 225 generates interfaces that display: for each geography, a ranking of trending news topics within the geography based on the clusters associated with the geography; for each topic, a list of articles associated with the topic from the geography and/or other geographies; and the sentiment spectrum associated with the topic and geography. Users may view all categories or one or more selected categories of articles across a specified number (e.g., a top 10) of news sources of a user-specified geography; may view all articles published across a specified number of news sources of all geographies within a specified category; and may combine various category and geography selections to enable any variation between all geographies and categories for which the news aggregation system 110 provides content. In this way, a user may, for example, see how the same topic is covered by news sources in different countries and how users on social networking platforms are responding to differences in coverage. Similarly, the plurality of interfaces allow the user to see which topics, same and/or distinct, are trending in different geographies, for example, which sports stories are trending in a first geography versus a second geography.

Example Computer System

Figure 7:
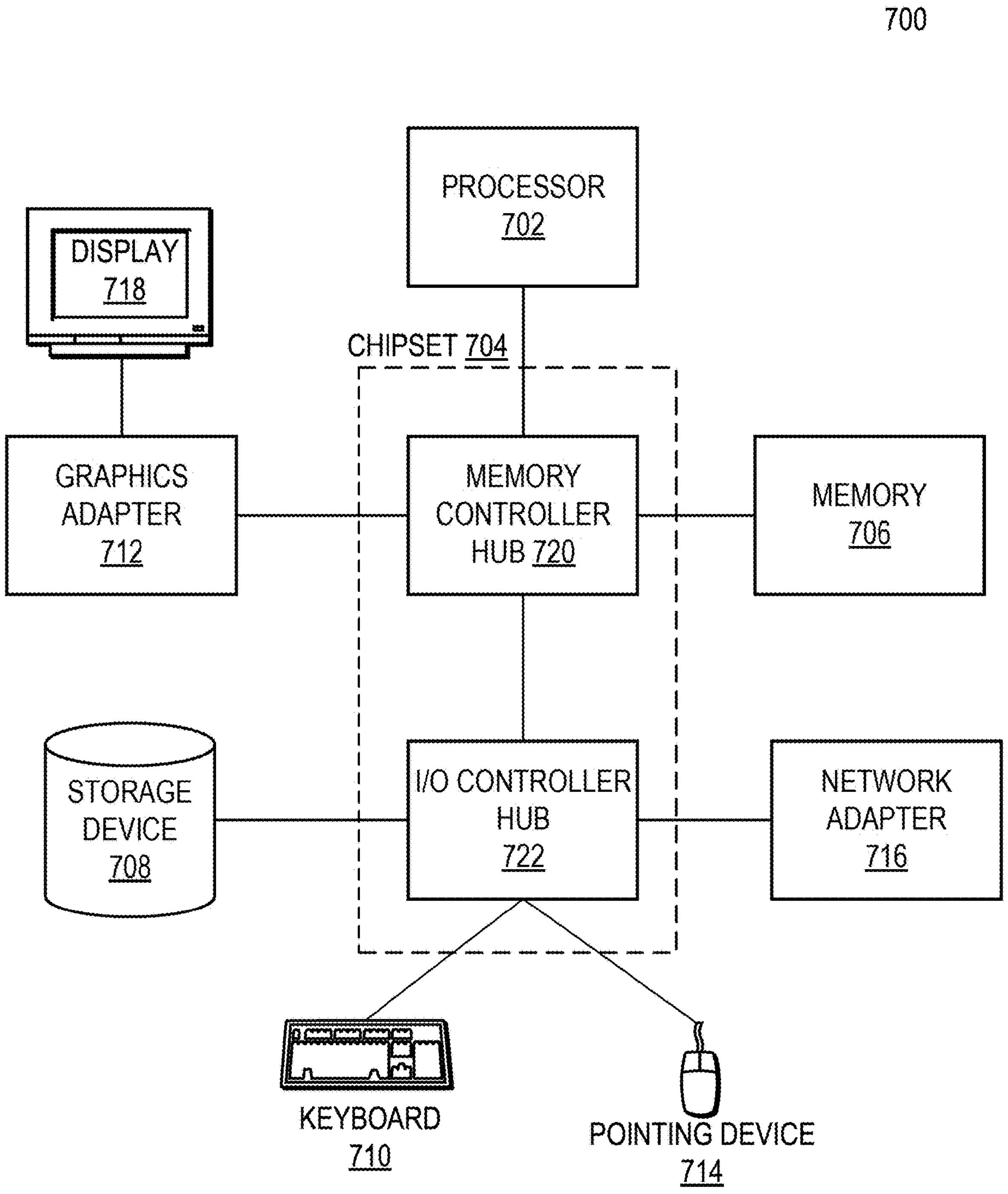
FIG. 7 is a block diagram illustrating components of a computer used as part or all of the news aggregation system or the user device, in accordance with one embodiment.

The entities of FIG. 1 are implemented using one or more computers. FIG. 7 is an example architecture of a computing device, according to an embodiment. Although FIG. 7 depicts a high-level block diagram illustrating physical components of a computer used as part or all of one or more entities described herein, in accordance with an embodiment, a computer may have additional, fewer, or variations of the components provided in FIG. 7. Although FIG. 7 depicts a computer 700, the figure is intended as functional description of the various features that may be present in computer systems than as a structural schematic of the implementations described herein. In practice, and as recognized by those of ordinary skill in the art, items shown separately could be combined and some items could be separated.

Illustrated in FIG. 7 are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O hub 722. In another embodiment, the memory 706 is coupled directly to the processor 702 instead of the chipset 704. In some embodiments, the computer 700 includes one or more communication buses for interconnecting these components. The one or more communication buses optionally include circuitry (sometimes called a chipset) that interconnects and controls communications between system components.

The storage device 708 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 708 can also be referred to as persistent memory. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a local or wide area network.

The memory 706 holds instructions and data used by the processor 702. The memory 706 can be non-persistent memory, examples of which include high-speed random-access memory, such as DRAM, SRAM, DDR RAM, ROM, EEPROM, flash memory.

As is known in the art, a computer 700 can have different and/or other components than those shown in FIG. 7. In addition, the computer 700 can lack certain illustrated components. In one embodiment, a computer 700 acting as a server may lack a keyboard 710, pointing device 714, graphics adapter 712, and/or display 718. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for operating a data management system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

processing, by a news aggregation system comprising a hardware processor and using a supervised machine-learned model, a plurality of content items retrieved from each of a plurality of third-party data sources in a geography to identify a plurality of keywords associated with the content items;

generating, by the news aggregation system, a plurality of clusters of information each associated with a topic by applying an unsupervised machine-learned model to the identified keywords;

generating, by the news aggregation system and using user sentiment data associated with the retrieved content items, a sentiment spectrum for each topic, the sentiment spectrum indicating respective portions of positive, neutral, and negative user reactions to retrieved content items associated with the topic and an overall sentiment label for the topic based on the respective portions; and generating, by the news aggregation system, a plurality of interfaces for display in a news aggregation application, the interfaces displaying:

a ranking of trending topics within the geography based on clusters associated with the geography;

for each topic, a list of content items associated with the topic from the geography; and for each topic, the sentiment spectrum associated with the topic and geography.

2. The method of claim 1, wherein the content items comprise news stories and are retrieved using a real-time or near-real-time crawling engine that mines content items from a plurality of websites associated with each of a plurality of news sources in the geography.

3. The method of claim 1, wherein the unsupervised machine-learned model clusters information based on one or more of content item category, subject, source, language of origin, and date.

4. The method of claim 1, wherein the user sentiment data is retrieved from a plurality of social networking platforms using one or more sentiment data crawlers.

5. The method of claim 1, further comprising retraining one or both of the supervised and unsupervised machine-learned models using user engagement data associated with the identified keywords or the generated sentiment label.

6. The method of claim 1, wherein the plurality of interfaces further include:

for each topic, a plurality of associated keywords; and for each keyword, a visual indication of a prevailing user sentiment to content items tagged with the keyword.

7. The method of claim 6, wherein the keywords are grouped on the interface based on the prevailing user sentiment.

8. A non-transitory computer readable storage medium comprising computer executable instructions that when executed by one or more processors causes the one or more processors to perform operations comprising:

processing, using a supervised machine-learned model, a plurality of content items retrieved from each of a plurality of third-party data sources in a geography to identify a plurality of keywords associated with the content items;

generating a plurality of clusters of information each associated with a topic by applying an unsupervised machine-learned model to the identified keywords;

generating, using user sentiment data associated with the retrieved content items, a sentiment spectrum for each topic, the sentiment spectrum indicating respective portions of positive, neutral, and negative user reactions to retrieved content items associated with the topic and an overall sentiment label for the topic based on the respective portions; and generating a plurality of interfaces for display in a news aggregation application, the interfaces displaying:

a ranking of trending topics within the geography based on clusters associated with the geography;

for each topic, a list of content items associated with the topic from the geography; and for each topic, the sentiment spectrum associated with the topic and geography.

9. The non-transitory computer readable storage medium of claim 8, wherein the content items comprise news stories and are retrieved using a real-time or near-real-time crawling engine that mines content items from a plurality of websites associated with each of a plurality of news sources in the geography.

10. The non-transitory computer readable storage medium of claim 8, wherein the unsupervised machine-learned model clusters information based on one or more of content item category, subject, source, language of origin, and date.

11. The non-transitory computer readable storage medium of claim 8, wherein the user sentiment data is retrieved from a plurality of social networking platforms using one or more sentiment data crawlers.

12. The non-transitory computer readable storage medium of claim 8, wherein the operations further comprise retraining one or both of the supervised and unsupervised machine-learned models using user engagement data associated with the identified keywords or the generated sentiment label.

13. The non-transitory computer readable storage medium of claim 8, wherein the plurality of interfaces further include:

for each topic, a plurality of associated keywords; and for each keyword, a visual indication of a prevailing user sentiment to content items tagged with the keyword.

14. The non-transitory computer readable storage medium of claim 13, wherein the keywords are grouped on the interface based on the prevailing user sentiment.

15. A computer system comprising:

one or more processors; and a non-transitory computer readable storage medium comprising computer executable instructions that when executed by one or more processors causes the one or more processors to perform operations comprising:

processing, using a supervised machine-learned model, a plurality of content items retrieved from each of a plurality of third-party data sources in a geography to identify a plurality of keywords associated with the content items;

generating a plurality of clusters of information each associated with a topic by applying an unsupervised machine-learned model to the identified keywords;

generating, using user sentiment data associated with the retrieved content items, a sentiment spectrum for each topic, the sentiment spectrum indicating respective portions of positive, neutral, and negative user reactions to retrieved content items associated with the topic and an overall sentiment label for the topic based on the respective portions; and generating a plurality of interfaces for display in a news aggregation application, the interfaces displaying:

a ranking of trending topics within the geography based on clusters associated with the geography;

for each topic, a list of content items associated with the topic from the geography; and for each topic, the sentiment spectrum associated with the topic and geography.

16. The computer system of claim 15, wherein the content items comprise news stories and are retrieved using a real-time or near-real-time crawling engine that mines content items from a plurality of websites associated with each of a plurality of news sources in the geography.

17. The computer system of claim 15, wherein the user sentiment data is retrieved from a plurality of social networking platforms using one or more sentiment data crawlers.

18. The computer system of claim 15, wherein operations further comprise retraining one or both of the supervised and unsupervised machine-learned models using user engagement data associated with the identified keywords or the generated sentiment label.

19. The computer system of claim 15, wherein the plurality of interfaces further include:

for each topic, a plurality of associated keywords; and for each keyword, a visual indication of a prevailing user sentiment to content items tagged with the keyword.

20. The computer system of claim 19, wherein the keywords are grouped on the interface based on the prevailing user sentiment.

* * * * *